(12) United States Patent
Homewood

(10) Patent No.: US 12,116,105 B2
(45) Date of Patent: Oct. 15, 2024

(54) AIRCRAFT COMPARTMENTAL BARRIER

(71) Applicant: AMSAFE BRIDPORT LIMITED, Bridport (GB)

(72) Inventor: James Barry Homewood, Bridport (GB)

(73) Assignee: AMSAFE BRIDPORT LIMITED, Bridport (GB)

( * ) Notice: Subject to any disclaimer, the term of this patent is extended or adjusted under 35 U.S.C. 154(b) by 511 days.

(21) Appl. No.: 17/505,093

(22) Filed: Oct. 19, 2021

(65) Prior Publication Data

US 2022/0119089 A1 Apr. 21, 2022

(30) Foreign Application Priority Data

Oct. 19, 2020 (GB) ..................................... 2016557

(51) Int. Cl.
*B64C 1/10* (2006.01)
*A62C 3/08* (2006.01)
(Continued)

(52) U.S. Cl.
CPC .................. *B64C 1/10* (2013.01); *A62C 3/08* (2013.01); *B64C 1/00* (2013.01); *B64C 1/1469* (2013.01); *B64C 2001/009* (2013.01)

(58) Field of Classification Search
CPC ... B64C 2001/009; B64C 1/1469; B64C 1/10; E06B 9/581; E06B 2009/585; A62C 3/08
See application file for complete search history.

(56) References Cited

U.S. PATENT DOCUMENTS 4,073,452 A 2/1978 Gosau
4,649,981 A * 3/1987 Bibeau .................... E06B 9/581
160/273.1
(Continued)

FOREIGN PATENT DOCUMENTS

EP 0905018 A2 3/1999
EP 2679501 A2 1/2014
(Continued)

OTHER PUBLICATIONS

Apr. 16, 2021 Search Report issued in British Patent Application No. 2016557.7.
(Continued)

*Primary Examiner* — Johnnie A. Shablack
(74) *Attorney, Agent, or Firm* — Oliff PLC

(57) ABSTRACT

A fabric barrier for an aircraft compartmental barrier includes a fabric barrier portion and a flexible crosspiece, wherein at least part of one edge of the fabric barrier portion terminates at the flexible crosspiece, wherein the flexible crosspiece is adapted to fit into and be retained within a partially covered groove, wherein the partially covered groove includes a pair of opposing flange portions covering a groove whereby a central longitudinal portion of the groove remains uncovered, wherein the flexible crosspiece is adapted to be released from the partially covered groove by passing between the pair of opposing flange portions during a decompression event. A decompression system for an aircraft compartmental barrier includes said fabric barrier, and a method for isolating two internal volumes within an aircraft using said decompression system.

16 Claims, 2 Drawing Sheets

(51) Int. Cl.
  *B64C 1/00* (2006.01)
  *B64C 1/14* (2006.01)

(56) References Cited

U.S. PATENT DOCUMENTS

| | | | | |
|---|---|---|---|---|
| 5,069,401 | A * | 12/1991 | Shepherd | B64D 25/00 454/71 |
| 5,526,865 | A * | 6/1996 | Coenraets | E06B 9/58 160/273.1 |
| 6,715,531 | B2 * | 4/2004 | Simon | E06B 9/581 160/84.06 |
| 7,578,477 | B2 * | 8/2009 | French | B64D 45/0028 49/31 |
| 8,037,921 | B2 * | 10/2011 | Dondlinger | E06B 9/581 160/264 |
| 9,205,908 | B2 * | 12/2015 | Roth | B64C 1/18 |
| 9,556,667 | B2 * | 1/2017 | Clos | B64D 11/0023 |
| 9,994,093 | B2 * | 6/2018 | Rikkert | B60J 1/2052 |
| 10,221,561 | B2 * | 3/2019 | Siller | E04B 1/947 |
| 10,543,896 | B2 * | 1/2020 | Zeeb | B64C 1/00 |
| 11,130,558 | B2 * | 9/2021 | Wood | F16K 17/16 |
| 2010/0200700 | A1 | 8/2010 | West et al. | |
| 2010/0219292 | A1 | 9/2010 | Saint-Jalmes et al. | |
| 2011/0139931 | A1 | 6/2011 | Opp et al. | |
| 2017/0096295 | A1 | 4/2017 | Pherson et al. | |
| 2022/0119089 | A1 * | 4/2022 | Homewood | A62C 3/08 |
| 2023/0133377 | A1 * | 5/2023 | Krueger | A62C 2/10 169/48 |

FOREIGN PATENT DOCUMENTS

| | | |
|---|---|---|
| EP | 2 990 334 A1 | 3/2016 |
| EP | 3 403 921 A1 | 11/2018 |
| WO | 2019/073226 A1 | 4/2019 |

OTHER PUBLICATIONS

May 18, 2022 extended Search Report issued in European Patent Application No. 21203524.0.

* cited by examiner

AIRCRAFT COMPARTMENTAL BARRIER

The invention relates to a fabric barrier for an aircraft compartmental barrier, a decompression system for an aircraft compartmental barrier comprising said fabric barrier, and a method for isolating two internal volumes within an aircraft using said decompression system.

It is known to provide isolation between neighbouring volumes within an aircraft by using a compartmental barrier. For example, within an aircraft fuselage, the crew and passenger compartment may be environmentally isolated from the cargo compartment so as to provide smoke and/or flame isolation, thereby reducing smoke and/or propagation of flames within the fuselage of the aircraft. Said barriers generally remain fixed in place should a decompression event occur on one side of the barrier. To this end, decompression panels may be provided in the barrier to protect the aircraft structure from damage.

WO 2019/073226 (Amsafe Bridport Limited) discloses a compartmental barrier comprising a cover having an aperture therein, the cover comprising a pocket around the edge of the aperture, and a burst-out disc substantially covering the aperture, and located within the pocket. One disadvantage of this arrangement is that it can only practically be used for small apertures.

EP 3 403 921 A (Amsafe Bridport Limited) discloses a barrier for providing isolation between two internal volumes within an aircraft comprising a wall section adapted for location within an aircraft, the wall section having an aperture formed therein, mounting means located on the wall section proximate the aperture, and a substantially planar burst panel member having first and second opposingly-facing sides. The burst panel member is adapted for location within the mounting means and dimensioned so as to overlie the aperture when received by the mounting means. The burst panel member comprises a line of weakness provided therein, adapted such that, in use, exposure of the burst panel member to an atmospheric pressure differential between air volumes respectively adjacent the first and second sides exceeding a predetermined value causes the burst panel member to rupture along said line of weakness. One disadvantage of this arrangement is that it is single use.

The present invention provides a fabric barrier for an aircraft compartmental barrier, a decompression system for an aircraft compartmental barrier comprising said fabric barrier, and a method for isolating two internal volumes within an aircraft using said decompression system which overcome at least one of the disadvantages of the prior art.

SUMMARY OF THE INVENTION

In a first aspect of the invention, a fabric barrier for an aircraft compartmental barrier is provided, the fabric barrier comprising a fabric barrier portion and a flexible crosspiece, wherein at least part of one edge of the fabric barrier portion terminates at the flexible crosspiece, wherein the flexible crosspiece is adapted to fit into and be retained within a partially covered groove, wherein the partially covered groove comprises a pair of opposing flange portions covering a groove whereby a central longitudinal portion of the groove remains uncovered, wherein the flexible crosspiece is adapted to be released from the partially covered groove by passing between the pair of opposing flange portions during a decompression event.

For the purposes of this specification, a material is considered 'flexible' if it visibly (without artificial magnification) bends during a decompression event where the difference in pressure is 0.172-1.72 kPa (0.025-0.25 psi), 0.344-1.72 kPa (0.050-0.25 psi), 0.516-1.72 kPa (0.075-0.25 psi), 0.688-1.72 kPa (0.100-0.25 psi), 0.86-1.72 kPa (0.125-0.25 psi), 1.032-1.72 kPa (0.150-0.25 psi), 1.204-1.72 kPa (0.175-0.25 psi), 1.376-1.72 kPa (0.2-0.25 psi), or 1.548-1.72 kPa (0.225-0.25 psi).

For the purposes of this specification, a material is considered 'inflexible' if it does not visibly (without artificial magnification) bend during a decompression event where the difference in pressure is as set forth for the definition of 'flexible'.

In a second aspect of the invention, a decompression system for an aircraft compartmental barrier is provided, the decompression system comprising:
(a) a fabric barrier according to the first aspect of the invention; and
(b) a pair of opposing flange portions adapted to partially cover a groove on an interior of an aircraft cabin or on an edge of an aperture in an aircraft compartmental barrier thereby to define a partially covered groove whereby a central longitudinal portion of the groove remains uncovered by the flange portions,
wherein the flexible crosspiece is adapted to fit into and be retained in the groove by the opposing flange portions and wherein the flexible crosspiece is adapted to be released from the partially covered groove passing between the pair of opposing flange portions during a decompression event.

In a third aspect of the invention, a method for isolating two internal volumes within an aircraft is provided, the method comprising the steps of:
(a) providing a decompression system according to the second aspect of the invention; and
(b) securing the fabric barrier to the interior of an aircraft cabin thereby creating two cabin volumes or securing the fabric barrier to edges of an aperture in an aircraft compartmental barrier thereby to cover the aperture, wherein the step of securing the fabric barrier comprises the steps of:
(i) fitting the pair of opposing flange portions to partially cover a groove on an interior of an aircraft cabin or on an edge of an aperture in an aircraft compartmental barrier thereby to define a partially covered groove whereby a central longitudinal portion of the groove remains uncovered by the flange portions; and
(ii) fitting the flexible crosspiece into the partially covered groove.

BRIEF DESCRIPTION OF THE FIGURES

One embodiment of the invention is described with reference to.

DETAILED DESCRIPTION OF THE INVENTION

Figure 1:
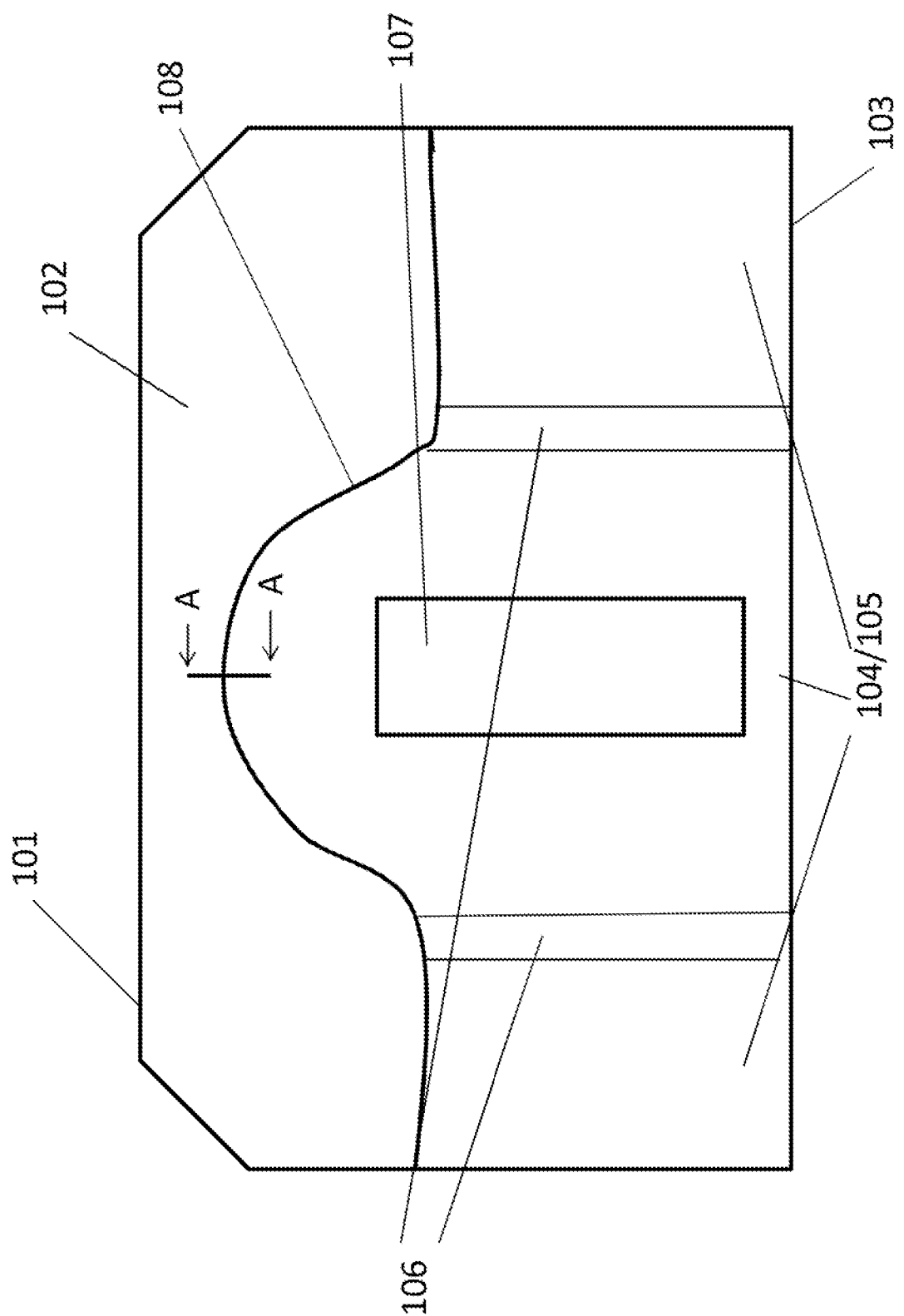
FIG. 1 which shows a cross-section of the upper half of an aircraft fuselage fitted with one embodiment of the fabric barrier and decompression system of the invention.

In a first aspect of the invention, a fabric barrier for an aircraft compartmental barrier is provided, the fabric barrier comprising a fabric barrier portion and a flexible crosspiece, wherein at least part of one edge of the fabric barrier portion terminates at the flexible crosspiece, wherein the flexible crosspiece is adapted to fit into and be retained within a partially covered groove, wherein the partially covered groove comprises a pair of opposing flange portions covering a groove whereby a central longitudinal portion of the groove remains uncovered, wherein the flexible crosspiece is adapted to be released from the partially covered groove by passing between the pair of opposing flange portions during a decompression event.

Preferably the fabric barrier is a fire and/or smoke barrier.

In one embodiment, all the edges of the fabric barrier portion except at least part of one edge terminate at the flexible crosspiece and preferably the at least part of one edge is adapted to remain fixed to an interior of an aircraft cabin or to an edge of an aperture in an aircraft compartmental barrier during a decompression event. In another embodiment all the edges of the fabric barrier portion may optionally terminate at the flexible crosspiece. In yet another embodiment, all the edges of the fabric barrier portion except a bottom edge terminate at the flexible crosspiece and preferably the bottom edge is adapted to remain fixed to an interior of an aircraft cabin or to a bottom edge of an aperture in an aircraft compartmental barrier during a decompression event.

The fabric barrier portion may comprise a glass fibre fabric with a flame resistant coating such as an acrylic copolymer coating, or an coated or uncoated aramid fabric.

The flexible crosspiece may comprise an elastomer selected from the group consisting of polyisoprene, polybutadiene, chloroprene rubber, butyl rubber, halogenated butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, fluoroelastomer, perfluoroelastomer, polyether block amide, chlorosulfonated polyethylene, ethylene-vinyl acetate, and mixtures thereof.

The flexible crosspiece may be joined to the edge of the fabric barrier portion by wrapping the flexible crosspiece in a hem formed from material forming the fabric barrier portion.

A decompression event preferably occurs when there is a difference in pressure across the flexible barrier, preferably wherein when the difference in pressure across the flexible barrier is in the range 0.172-1.72 kPa (0.025-0.25 psi), 0.344-1.72 kPa (0.050-0.25 psi), 0.516-1.72 kPa (0.075-0.25 psi), 0.688-1.72 kPa (0.100-0.25 psi), 0.86-1.72 kPa (0.125-0.25 psi), 1.032-1.72 kPa (0.150-0.25 psi), 1.204-1.72 kPa (0.175-0.25 psi), 1.376-1.72 kPa (0.2-0.25 psi), or 1.548-1.72 kPa (0.225-0.25 psi).

In a second aspect of the invention, a decompression system for an aircraft compartmental barrier is provided, the decompression system comprising:
(a) a fabric barrier according to the first aspect of the invention; and
(b) a pair of opposing flange portions adapted to partially cover a groove on an interior of an aircraft cabin or on an edge of an aperture in an aircraft compartmental barrier thereby to define a partially covered groove whereby a central longitudinal portion of the groove remains uncovered by the flange portions,
wherein the flexible crosspiece is adapted to fit into and be retained in the groove by the opposing flange portions and wherein the flexible crosspiece is adapted to be released from the partially covered groove passing between the pair of opposing flange portions during a decompression event.

Portions of the pair of opposing flange portions adjacent the central longitudinal portion of the groove may comprise a flexible material. In particular, the pair of opposing flange portions may comprise a layer of the flexible material and a layer of inflexible material, wherein the layer of the flexible material is adapted to be in contact with the flexible crosspiece when the flexible crosspiece is retained within the partially covered groove, wherein the layer of inflexible material covers less of the groove than the layer of the flexible material and is thereby adapted to allow the layer of the flexible material to bend away from the partially covered groove when, in use, the flexible crosspiece is pulled from the partially covered groove during a decompression event.

The flexible material may comprise an elastomer selected from the group consisting of polyisoprene, polybutadiene, chloroprene rubber, butyl rubber, halogenated butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, fluoroelastomer, perfluoroelastomer, polyether block amide, chlorosulfonated polyethylene, ethylene-vinyl acetate, and mixtures thereof.

The inflexible material may be selected from the group consisting of steel, aluminium, titanium or their alloys; fibrous composites such as carbon- and glass-fibre-reinforced plastic; metal matrix composites such as silicon carbide particles combined with an aluminium alloy; rigid plastics such as thermosetting plastics; and composites thereof.

Alternatively, the opposing flange portions solely comprises inflexible material, preferably wherein the inflexible material is selected from the group consisting of steel, aluminium, titanium or their alloys; fibrous composites such as carbon- and glass-fibre-reinforced plastic; metal matrix composites such as silicon carbide particles combined with an aluminium alloy; rigid plastics such as thermosetting plastics; and composites thereof.

The opposing flange portions may form a second arm of a substantially L-shaped piece and a first arm of the substantially L-shaped piece is adapted to be reversibly attached adjacent to a substantially flat elongate surface on an interior of an aircraft cabin or on the edge of an aperture in an aircraft compartmental barrier thereby forming the partially covered groove.

Optionally, one or both of the opposing flange portions may be demountable thereby enabling fitting of the flexible crosspiece into the partially covered groove.

In a third aspect of the invention, a method for isolating two internal volumes within an aircraft is provided, the method comprising the steps of:
(a) providing a decompression system according to the second aspect of the invention; and
(b) securing the fabric barrier to the interior of an aircraft cabin thereby creating two cabin volumes or securing the fabric barrier to edges of an aperture in an aircraft compartmental barrier thereby to cover the aperture, wherein the step of securing the fabric barrier comprises the steps of:
(i) fitting the pair of opposing flange portions to partially cover a groove on an interior of an aircraft cabin or on an edge of an aperture in an aircraft compartmental barrier thereby to define a partially covered groove whereby a central longitudinal portion of the groove remains uncovered by the flange portions; and (ii) fitting the flexible crosspiece into the partially covered groove.

FIG. 1 shows a cross-section of the upper half of an aircraft fuselage (101) fitted with one embodiment of the fabric barrier and decompression system of the invention. The aircraft fuselage comprises a fixed and rigid header (102) dropping down from the cabin ceiling, a floor beam (103), and a fabric barrier (104) fitted therebetween dividing the aircraft cabin into two isolated portions. The header comprises an inflexible material such as steel, aluminium, titanium or their alloys; fibrous composites such as carbon- and glass-fibre reinforced plastic; metal matrix composites such as silicon carbide particles combined with an aluminium alloy; rigid plastics such as thermosetting plastics; or composites thereof. The flexible barrier comprises a flexible barrier portion (105) comprising seams (106) and a door (107). The fabric barrier portion comprises, for example, a woven glass-fibre fabric with a flame resistant acrylic copolymer coating.

The fabric barrier portion is fixed to the floor beam and remains fixed thereto during a decompression event. The remainder of the fabric barrier portion is fixed to the inside of the aircraft fuselage via a T-seal (108) and detaches from the inside of the aircraft fuselage falling to the floor of the aircraft cabin during a decompression event in one of the two isolated portions of the aircraft cabin thereby to equalise the pressures either side of the fabric barrier.

Figure 2A:
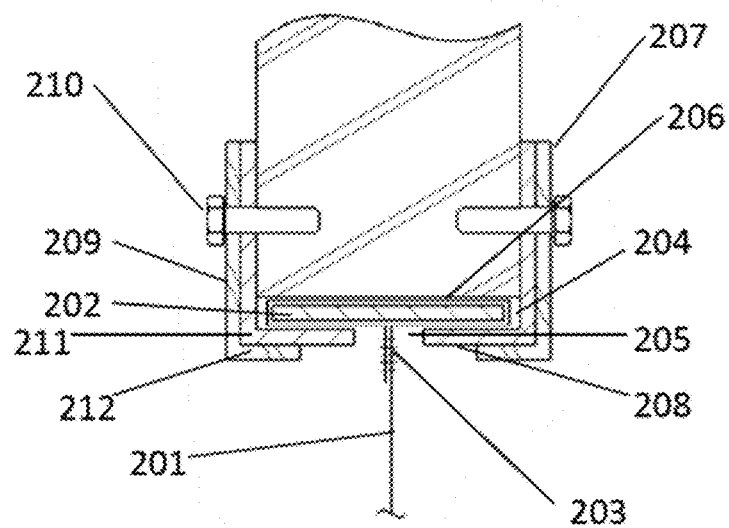
FIG. 2a which shows a cross-section of the interface between the fabric barrier portion of the fabric barrier and decompression system of the invention and the interior of an aircraft cabin denoted A-A in FIG. 1.

FIG. 2a shows a cross-section of the interface between the fabric barrier portion (201) of the decompression system of the invention and the interior of an aircraft cabin denoted A-A in FIG. 1. The fabric barrier portion divides an aircraft cabin into two isolated portions. The material forming the fabric barrier portion is wrapped around a flexible crosspiece (202) and the end folded back on itself and fixed forming a hem (203). The flexible crosspiece comprises, for example, a silicone rubber. The flexible crosspiece is held within a partially covered groove (204) whereby a central longitudinal portion of the groove remains uncovered (205).

The partially covered groove is defined by a substantially flat elongate end surface of the header (206) partially covered by two L-shaped pieces (207) wherein a first arm of each L-shaped piece (209) is demountably fixed either side of the header using bolts (210) and a second arm of each L-shaped piece, termed a flange portion (208), is held in spaced arrangement to the substantially flat elongate end surface of the header whereby a central longitudinal portion of the substantially flat elongate end surface of the header remains uncovered.

Each L-shaped piece comprises a layer of flexible material (211) and a layer of inflexible material (212), wherein the layer of flexible material is adapted to be in contact with the flexible crosspiece when the flexible crosspiece is retained within the partially covered grove and the layer of inflexible material covers less of the groove than the layer of flexible material. The layer of flexible material comprises, for example, a silicone rubber. The layer of inflexible material comprises, for example, steel, aluminium, titanium or their alloys; fibrous composites such as carbon- and glass-fibre reinforced plastic; metal matrix composites such as silicon carbide particles combined with an aluminium alloy; rigid plastics such as thermosetting plastics; or composites thereof. Thus the flexible crosspiece is held within the partially covered groove because the width of the flexible crosspiece is larger than the width of the uncovered portion of the groove as defined by the aforementioned layer of flexible material, i.e., the central longitudinal portion of the groove.

In another embodiment (not shown), each L-shaped piece only comprises a layer of inflexible material, typically formed from steel, aluminium, titanium or their alloys; fibrous composites such as carbon- and glass-fibre reinforced plastic; metal matrix composites such as silicon carbide particles combined with an aluminium alloy; rigid plastics such as thermosetting plastics; or composites thereof, which serves the same purpose as the L-shaped pieces shown in FIG. 2a of holding the flexible crosspiece within the partially covered groove because the width of the flexible crosspiece is larger than the width of the uncovered portion of the groove as defined by the aforementioned L-shaped pieces, i.e., the central longitudinal portion of the groove.

In another embodiment (not shown), the partially covered groove is defined by a longitudinal groove in an end surface of the header partially covered by two opposing flange portions demountably fixed either side of the groove, whereby a central longitudinal portion of the groove remains uncovered. The two opposing flange portions may be formed in the same way as described for the L-shaped pieces.

Figure 2B:
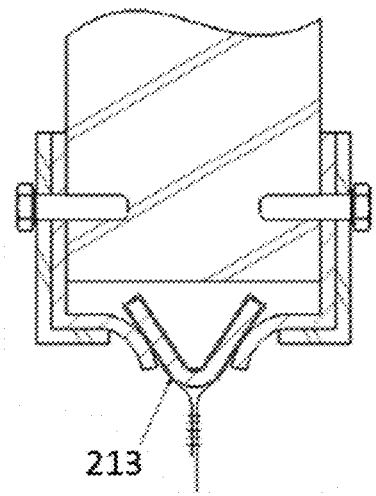
FIG. 2b which shows the same cross-section of the interface between the fabric barrier portion of the fabric barrier and decompression system of the invention shown in FIG. 2a during a decompression event.

As shown in FIG. 2b, during a decompression event in one of the two isolated portions of the aircraft cabin, air will attempt to move from the portion of the cabin with higher air pressure to the portion of the cabin with lower air pressure and the fabric barrier portion will be subject to a force from the side adjacent the portion of the cabin with higher air pressure. If the pressure difference between the two isolated portions of aircraft cabin falls, for example, in the range 0.172-1.72 kPa (0.025-0.25 psi), 0.344-1.72 kPa (0.050-0.25 psi), 0.516-1.72 kPa (0.075-0.25 psi), 0.688-1.72 kPa (0.100-0.25 psi), 0.86-1.72 kPa (0.125-0.25 psi), 1.032-1.72 kPa (0.150-0.25 psi), 1.204-1.72 kPa (0.175-0.25 psi), 1.376-1.72 kPa (0.2-0.25 psi), or 1.548-1.72 kPa (0.225-0.25 psi), then the flexible crosspiece will be pulled out from the partially covered groove. In particular, the flexible crosspiece, under tension, deforms into a V-shape (213), and simultaneously each layer of the flexible material is bent away from the partially covered groove as the flexible crosspiece is pulled from the partially covered groove.

When each L-shaped piece only comprises a layer of inflexible material, during a decompression event where the pressure difference between the two isolated portions of aircraft cabin falls, for example, in the ranges as set forth above, the flexible crosspiece, under tension, deforms into a V-shape (213) as shown in FIG. 2b, and is pulled from the partially covered groove.

The embodiment of partially covered groove defined by a longitudinal groove in an end surface of the header partially covered by two opposing flange portions demountably fixed either side of the groove operates, during a decompression event where the pressure difference between the two isolated portions of aircraft cabin falls, for example, in the ranges as set forth above, as described for embodiments of partially covered groove formed from L-shaped pieces.

When the flexible crosspiece is released from the partially covered groove at all points on the fabric barrier portion, the fabric barrier will rapidly fall to the floor of the cabin under its own weight thereby rapidly eliminating the pressure difference across the fabric barrier portion and thereby preventing potential structural damage to the aircraft fuselage.

The flexible barrier can be reattached to the interior of an aircraft cabin by detaching one of the two L-shaped pieces by removing the bolt(s) affixing the L-shaped piece to the header or other interior part of the aircraft fuselage, fitting the flexible crosspiece into the now opened partially covered groove, and then refitting the L-shaped piece back to the header or other interior part of the aircraft fuselage. Alternatively, where the partially covered groove is defined by a longitudinal groove in an end surface of the header or other interior part of the aircraft fuselage partially covered by two opposing flange portions demountably fixed either side of the groove, the fabric barrier can be reattached to the interior of an aircraft cabin by detaching one of the two opposing flange portions, fitting the flexible crosspiece into the now opened partially covered groove, and then refitting the opposing flange portion back to the header or other interior part of the aircraft fuselage.

The foregoing embodiments of the fabric barrier and decompression system for an aircraft of the invention can also be adapted for use in an aperture in an aircraft compartmental barrier to operate in a similar way.

The invention claimed is:

1. A decompression system for an aircraft compartmental barrier, the decompression system comprising:
   (a) a fabric barrier for an aircraft compartmental barrier, the fabric barrier comprising a fabric barrier portion and a flexible crosspiece, wherein at least part of one edge of the fabric barrier portion terminates at the flexible crosspiece; and
   (b) a pair of opposing flange portions adapted to partially cover a groove on an interior of an aircraft cabin or on an edge of an aperture in an aircraft compartmental barrier thereby to define a partially covered groove whereby a central longitudinal portion of the groove remains uncovered by the flange portions, wherein the flexible crosspiece is adapted to fit into and be retained in the groove by the opposing flange portions and wherein the flexible crosspiece is adapted to be released from the partially covered groove passing between the pair of opposing flange portions during a decompression event.

2. The decompression system according to claim 1, wherein the fabric barrier is a fire and/or smoke barrier.

3. The decompression system according to claim 1, wherein all the edges of the fabric barrier portion except at least part of one edge terminate at the flexible crosspiece.

4. The decompression system according to claim 1, wherein all the edges of the fabric barrier portion terminate at the flexible crosspiece.

5. The decompression system according to claim 1, wherein all the edges of the fabric barrier portion except a bottom edge terminate at the flexible crosspiece.

6. The decompression system according to claim 1, wherein the fabric barrier portion comprises a glass fibre fabric with a flame resistant coating.

7. The decompression system according to claim 1, wherein the flexible crosspiece comprises an elastomer selected from the group consisting of polyisoprene, polybutadiene, chloroprene rubber, butyl rubber, halogenated butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, fluoroelastomer, perfluoroelastomer, polyether block amide, chlorosulfonated polyethylene, ethylene-vinyl acetate, and mixtures thereof.

8. The decompression system according to claim 1, wherein the flexible crosspiece is joined to the edge of the fabric barrier portion by wrapping the flexible crosspiece in a hem formed from material forming the fabric barrier portion.

9. The decompression system according to claim 1, wherein a decompression event occurs when there is a difference between in pressure across the fabric barrier.

10. The decompression system according to claim 1, wherein the opposing flange portions solely comprise inflexible material; fibrous composites; metal matrix composites; rigid plastics; and composites thereof.

11. A method for isolating two internal volumes within an aircraft, the method comprising the steps of:
   (a) providing a decompression system according to claim 1; and
   (b) securing the fabric barrier to the interior of an aircraft cabin thereby creating two cabin volumes or securing the fabric barrier to edges of an aperture in an aircraft compartmental barrier thereby to cover the aperture, wherein the step of securing the fabric barrier comprises the steps of:
      (i) fitting the pair of opposing flange portions to partially cover a groove on an interior of an aircraft cabin or on an edge of an aperture in an aircraft compartmental barrier thereby to define a partially covered groove whereby a central longitudinal portion of the groove remains uncovered by the flange portions; and
      ii fitting the flexible crosspiece into the partially covered groove.

12. The decompression system according to claim 1, wherein portions of the pair of opposing flange portions adjacent the central longitudinal portion of the groove comprise a flexible material.

13. The decompression system according to claim 12, wherein the flexible material comprises an elastomer selected from the group consisting of polyisoprene, polybutadiene, chloroprene rubber, butyl rubber, halogenated butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, fluoroelastomer, perfluoroelastomer, polyether block amide, chlorosulfonated polyethylene, ethylene-vinyl acetate, and mixtures thereof.

14. The decompression system according to claim 12, wherein the pair of opposing flange portions comprise a layer of the flexible material and a layer of inflexible material, wherein the layer of the flexible material is adapted to be in contact with the flexible crosspiece when the flexible crosspiece is retained within the partially covered groove, wherein the layer of inflexible material covers less of the groove than the layer of the flexible material thereby to allow the layer of the flexible material to bend away from the partially covered groove when, in use, the flexible crosspiece is pulled from the partially covered groove during a decompression event.

15. The decompression system according to claim 14, wherein the inflexible material is selected from the group consisting of steel, aluminium, titanium or their alloys; fibrous composites; metal matrix composites; rigid plastics; and composites thereof.

16. The decompression system according to claim 14, wherein the flexible material comprises an elastomer selected from the group consisting of polyisoprene, polybutadiene, chloroprene rubber, butyl rubber, halogenated butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, fluoroelastomer, perfluoroelastomer, polyether block amide, chlorosulfonated polyethylene, ethylene-vinyl acetate, and mixtures thereof.

\* \* \* \* \*